UNITED STATES PATENT OFFICE.

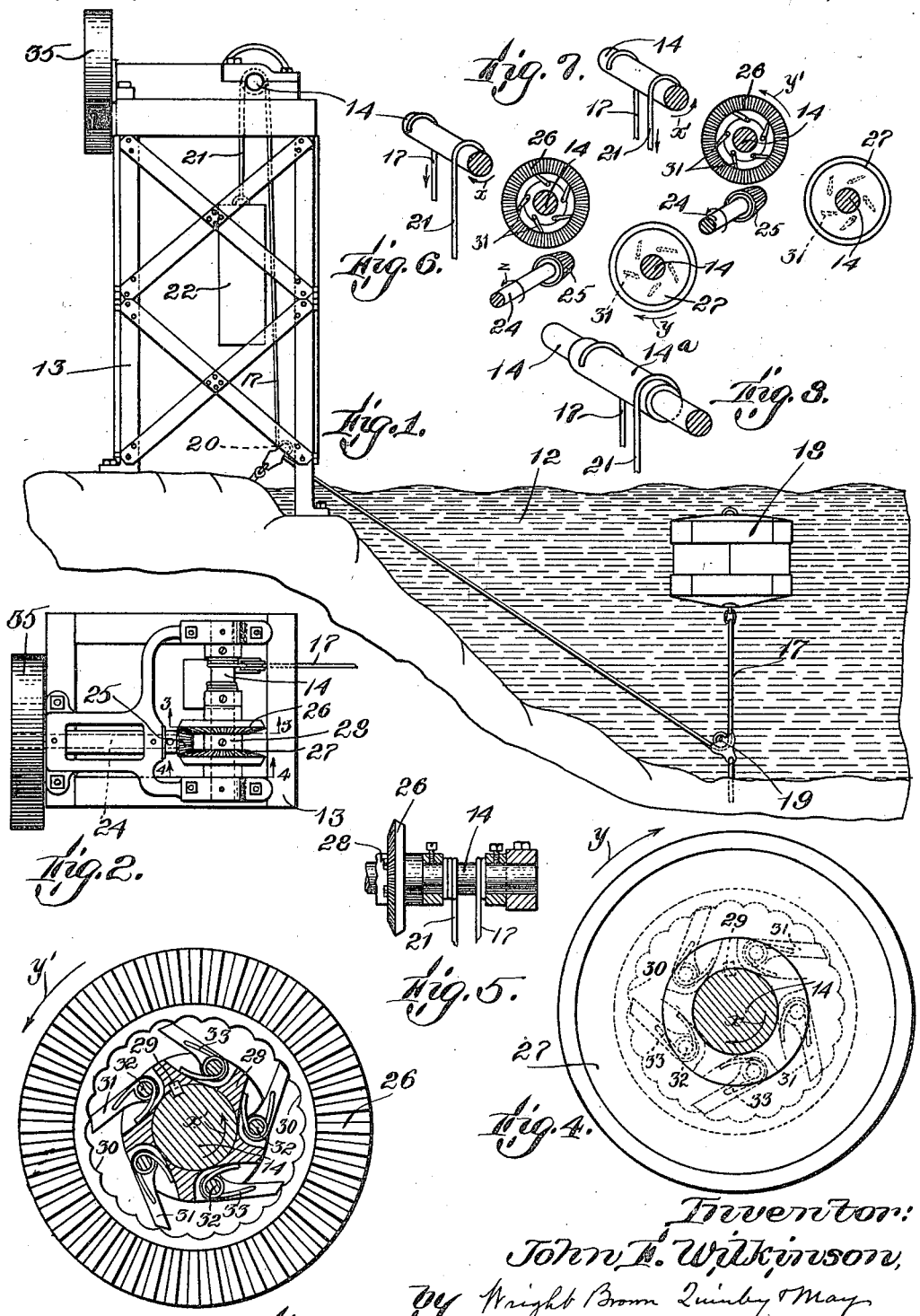

JOHN F. WILKINSON, OF WINCHENDON, MASSACHUSETTS.

MARINE POWER-STATION.

1,318,469.  Specification of Letters Patent.  Patented Oct. 14, 1919.

Application filed July 18, 1918. Serial No. 245,490.

*To all whom it may concern:*

Be it known that I, JOHN F. WILKINSON, a citizen of the United States, residing at Winchendon, in the county of Worcester and State of Massachusetts, have invented new and useful Improvements in Marine Power-Stations, of which the following is a specification.

This invention relates to means for utilizing the rise and fall and the lateral surging movements of tidal waters for producing power, and is embodied in the improvements hereinafter described and claimed.

Of the accompanying drawings forming a part of this specification,—

Figure 1 is a side elevation of a power station embodying the invention.

Fig. 2 is a top plan view, the float being omitted.

Fig. 3 is a section on line 3—3 of Fig. 2.

Fig. 4 is a section on line 4—4 of Fig. 2.

Fig. 5 is a side view of a portion of the rockshaft hereinafter described, and a side view of one of the gears thereon.

Figs. 6 and 7 are fragmentary perspective views illustrating the means for transmitting torque from the rockshaft to the driven shaft.

Fig. 8 is a perspective view of a portion of the rockshaft showing a modification.

The same reference characters indicate the same parts in all of the figures.

In the drawings, 12 represents a body of tidal water, and 13 represents a fixed supporting frame adjacent to and elevated above said body.

14 represents a rockshaft journaled in fixed bearings on the frame 13. 17 represents a primary cable attached at one end to and partially wound upon the shaft 14. 18 represents an air-tight hollow float or air chamber attached to the free end of the primary cable 17. 19 represents a submarine cable-guiding mooring, such as a pulley-block, anchored under the body 12 at a considerable distance outward from the frame 13, and coöperating with the primary cable and the mechanism hereinafter described, to confine the float preferably below the surface of the water. 20 represents a cable-deflecting guide, such as a pulley-block, anchored between said mooring and the drum 15, the cable being free to reeve or move longitudinally in the mooring 19 and guide 20.

The mooring 19 is located at a considerable distance outward from the brink of the body of water, so that the float, which normally occupies a position directly over the mooring when the water is at rest, is moved in a substantially horizontal direction from its normal position toward and from the brink by motion transmitted by the surging of the water. When the water surges inwardly the float is moved inwardly from its normal position, and when the water surges outwardly the float is moved outwardly from said position. Each of said movements causes the float to exert a pull on the cable and thereby rotate the rockshaft in a forward direction. While the float is returning from either extreme of its excursion to its normal or central position, its pull on the cable ceases until the float passes the central position, and commences to move therefrom toward the opposite extreme of its excursion.

I have provided yielding means constantly exerting a torque on the rockshaft to rotate the latter backwardly, said means yielding to the pull exerted on the rockshaft by the float through the cable 17, as above described, and acting only when the pull of the float on the cable temporarily ceases, the rockshaft being therefore rotated first forward and then backward.

Said yielding means may be embodied in a secondary cable 21 attached at one end to the shaft 14 and partially wound thereon, and a weight 22 supported by the secondary cable and exerting a constant pull thereon, the arrangement of said cable being such that when it is unwound from the rockshaft 14 by the action of the weight, the rockshaft is rotated in a backward direction.

The weight and float are preferably so proportioned that the weight normally holds the float in a submerged position as shown. The lateral force exerted on the float by the surging water, and the buoyancy of the submerged float act conjointly to overcome the weight while the float is moving from its normal position toward either end of its excursion. The lifting force due to the rise of the water when it is surging inwardly, aids in the rotation of the rockshaft by the float.

It will be seen that the operative movements of the float are approximately horizontal and are caused mainly by the surging movements of the water, and that the freedom of the float to move horizontally enables it to have operative movements of much greater amplitude and effectiveness than would be the case if the float were movable only in vertical directions.

The opposite rotary movements of the rock-shaft 14 are utilized to impart unidirectional rotary movement to a driven shaft 24 through mechanism such as that shown by Figs. 2, 3, 5, 6, and 7. The driven shaft 24 is arranged at right angles with the rockshaft 14, is journaled in bearings on the frame 13, and is provided with a relatively small bevel gear 25, which I call the driven gear. Mounted on the rockshaft are two larger bevel gears 26 and 27, at opposite sides of the gear 25, and meshing therewith. I call the gears 26 and 27 driving gears. Each of said driving gears is adapted to rotate loosely in one direction on the rockshaft, and is engaged therewith by a one-way clutch which as here shown is embodied in a hub 28 fixed, as by a key 29, to the rockshaft and located in a recess in one side of the corresponding driving gear, the margin of said recess being formed by a ratcheted internal face 30, and a series of pawls 31 pivoted at 32 to the hub and pressed outwardly by springs 33 against the said ratcheted face, the pawls being substantially tangential to the hub, as shown by Figs. 3 and 4. The action of the described mechanism for imparting unidirectional rotation from the rockshaft to the driven shaft, is clearly shown by Figs. 6 and 7, which show the rockshaft broken into three sections, one connected with the cables 17 and 21, another bearing the driving gear 26, and the third bearing the driving gear 27, the driven gear 25 being separated from the driving gears for clearness of illustration.

Referring to Fig. 6, it will be seen that when a pull is exerted on the primary cable 17, and the rockshaft is rotated forward, as indicated by arrow $x$, the driving gear 27 is positively rotated in the same direction as indicated by arrow $y$, and rotates the driven gear 25 as indicated by arrow $z$, the driving gear 26 being idle and free to be rotated by the driven gear 25.

Referring to Fig. 7, it will be seen that when the primary cable is released, a pull is exerted on the secondary cable, by the weight, and the rockshaft is thereby rotated backward as indicated by arrow $x'$, and the driving gear 26 is positively rotated in the same direction as indicated by arrow $y'$, and rotates the driven gear in the same direction as before, owing to the fact that the gears 26 and 27 are at opposite sides of the gear 25, the driving gear 27 being idle and free to be rotated by the driven gear.

The ratcheted face 30 is preferably formed by a plurality of concave face portions meeting to form teeth of the form shown by Figs. 3 and 4. The pawls 31 are so arranged that their outer ends engage different portions of said teeth as shown, the arrangement being such that there can be no back-lash or lost motion, one or more of the pawls being always in operative engagement with a like number of teeth.

It is obvious that the cables 17 and 21 may be wound on an enlargement of the rockshaft constituting a drum 14$^a$, as shown by Fig. 8.

It is also obvious that the cables 17 and 21 may be portions of a continuous cable attached at one end to the float and at the other end to the weight, intermediate portions of the cable being wound in opposite directions on the rockshaft, and no connection between the cables and rockshaft being required other than that afforded by winding the cables on the rockshaft.

The weight should equal in avoirdupois substantially one-half the lifting power of the float, minus such friction as may be developed in the mechanism.

35 represents a fly-wheel attached to the driven shaft 24. This member may be the armature of an electric generator.

The gears 26 and 27 constitute two rotary torque-transmitting members coaxial with and rotable independently of the rock-shaft 14. The oppositely acting one-way clutches constitute torque-transmitting connections between the rock-shaft and said members. The gear teeth on the members 26 and 27, and the gear 25 engaged with said teeth, constitute torque-transmitting connections between said members and the driven shaft 24.

It will be seen that the arrangement is such that one of said rotary members is positively rotated in one direction when the rock-shaft is rotated by the float 18, and the other rotary member is positively rotated in the opposite direction when the rock-shaft is rotated by the weight 22, said members conjointly imparting an uninterrupted unidirectional rotation to the driven shaft 24, and each of said members being loosely rotatable in a direction opposite that of its positive rotation.

I claim:

1. In a marine power station, in combination, a rockshaft journaled adjacent to a body of water, a primary cable connected at one end portion with said shaft, to rotate the latter forward when a pull is exerted on the primary cable, a float connected with the opposite end of the primary cable, guiding means permitting endwise movements of the primary cable and locating the float normally in a central position, at a distance outward from the brink of said body, a secondary cable connected at one end portion with the rock-shaft to rotate the latter backward when a pull is exerted on the secondary cable, a weight connected with the opposite end of the secondary cable and exerting a constant pull thereon, the float being movable inward and outward from a central position by the surging of the water, and caused thereby to alternately pull and release the primary cable, a driven shaft at an angle with the rockshaft, two rotary torque-transmitting members coaxial with and rotatable independently of the rock-shaft, and torque-transmitting connections between the rockshaft and said members, and between said members and the driven shaft, the arrangement being such that one member is positively rotated in one direction when the rock-shaft is rotated by the float, and the other member is positively rotated in the opposite direction when the rock-shaft is rotated by the weight, said members conjointly imparting an uninterrupted unidirectional rotation to the driven shaft, each member being loosely rotatable in a direction opposite that of its positive rotation.

2. In a marine power station, in combination, a rockshaft journaled adjacent to a body of water, a primary cable connected at one end portion with said shaft, to rotate the latter forward when a pull is exerted on the primary cable, a float connected with the opposite end of the primary cable, guiding means permitting endwise movements of the primary cable and locating the float normally in a central position, at a distance outward from the brink of said body, a secondary cable connected at one end portion with the rockshaft to rotate the latter backward when a pull is exerted on the secondary cable, a weight connected with the opposite end of the secondary cable, and exerting a constant pull thereon, the float being movable inward and outward from a central position by the surging of the water, and caused thereby to alternately pull and release the primary cable, a driven shaft at an angle with the rockshaft and provided with a driven bevel gear, two driving bevel gears loosely mounted on the rockshaft and meshing with said driven gear at opposite sides of the latter, and one-way clutches connecting said driving gears with the rockshaft, and organized to positively rotate one driving gear with the rockshaft when the latter is rotated forward, and the other driving gear with the rockshaft when the latter is rotated backward, each driving gear being idle and free to be rotated by the driven gear when the other driving gear is positively rotated.

3. In a marine power station, in combination, a rockshaft journaled adjacent to a body of water, a primary cable connected at one end portion with said shaft, to rotate the latter forward when a pull is exerted on the primary cable, a float connected with the opposite end of the primary cable, guiding means permitting endwise movements of the primary cable and locating the float normally in a central position, at a distance outward from the brink of said body, a secondary cable connected at one end portion with the rockshaft to rotate the latter backward when a pull is exerted on the secondary cable, a weight connected with the opposite end of the secondary cable and exerting a constant pull thereon, the float being movable inward and outward from a central position by the surging of the water, and caused thereby to alternately pull and release the primary cable, a driven shaft at an angle with the rockshaft and provided with a driven bevel gear, two driving bevel gears loosely mounted on the rockshaft and meshing with said driven gear at opposite sides of the latter, and one-way clutches connecting said driving gears with the rockshaft, and organized to positively rotate one driving gear with the rockshaft when the latter is rotated forward, and the other driving gear with the rockshaft when the latter is rotated backward, each driving gear being idle and free to be rotated by the driven gear when the other driving gear is positively rotated, each of said clutches including a hub fixed to the rockshaft, an annular ratched internal face on one of the driving gears, and pawls pivoted to said hub, and arranged substantially tangential thereto and yieldingly pressed against said ratcheted face.

In testimony whereof I affix my signature.

JOHN F. WILKINSON

Copies of this patent may be obtained for five cents each, by addressing the "Commissioner of Patents, Washington, D. C."